(12) United States Patent
Peduto

(10) Patent No.: US 9,000,082 B2
(45) Date of Patent: *Apr. 7, 2015

(54) HEAT/LIGHT-STABILIZED POLYAMIDE COMPOSITIONS

(71) Applicant: Rhodia Operations, Aubervilliers (FR)

(72) Inventor: Nicolangelo Peduto, Milan (IT)

(73) Assignee: Rhodia Operations, Aubervilliers (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/672,807

(22) Filed: Nov. 9, 2012

(65) Prior Publication Data

US 2013/0072616 A1 Mar. 21, 2013

Related U.S. Application Data

(63) Continuation of application No. 12/745,934, filed as application No. PCT/EP2008/066528 on Dec. 1, 2008, now Pat. No. 8,349,936.

(30) Foreign Application Priority Data

Dec. 4, 2007 (FR) ...................................... 07 08445

(51) Int. Cl.
| | |
|---|---|
| *C08K 3/22* | (2006.01) |
| *C08K 3/00* | (2006.01) |
| *C08L 77/06* | (2006.01) |
| *C08K 13/04* | (2006.01) |
| *C08L 77/00* | (2006.01) |
| *C08K 3/16* | (2006.01) |
| *C08K 7/14* | (2006.01) |
| *C08L 51/06* | (2006.01) |

(52) U.S. Cl.
CPC ............... *C08K 3/0041* (2013.01); *C08L 77/06* (2013.01); *C08K 13/04* (2013.01); *C08L 77/00* (2013.01); *C08K 3/16* (2013.01); *C08K 3/22* (2013.01); *C08K 7/14* (2013.01); *C08L 51/06* (2013.01)

(58) Field of Classification Search
USPC ........................................................ 524/431
See application file for complete search history.

(56) References Cited

U.S. PATENT DOCUMENTS

| 3,795,523 A | 3/1974 | Moriya et al. | |
|---|---|---|---|
| 5,565,158 A * | 10/1996 | Sullivan et al. | ............... 264/103 |
| 2003/0111776 A1 | 6/2003 | Joachimi et al. | |
| 2009/0142585 A1* | 6/2009 | Kobayashi et al. | ........... 428/328 |

FOREIGN PATENT DOCUMENTS

| DE | 10011452 A1 | 9/2001 |
|---|---|---|
| EP | 0585056 B1 | 3/1994 |
| JP | 6043551 B2 | 6/1994 |

* cited by examiner

*Primary Examiner* — Peter Szekely
(74) *Attorney, Agent, or Firm* — Dentons US LLP

(57) ABSTRACT

Heat and light-stabilized polyamide compositions containing a stabilization system that includes copper oxide and KBr, and have an excellent preservation of color and of the mechanical properties thereof after exposure to heat or to light; these compositions are especially useful for producing shaped articles in the automotive field.

17 Claims, No Drawings

HEAT/LIGHT-STABILIZED POLYAMIDE COMPOSITIONS

CROSS-REFERENCE TO EARLIER APPLICATIONS

This application is a continuation of copending U.S. patent application Ser. No. 12/745,934, filed Sep. 8, 2010, which is a U.S. National Stage of PCT/EP2008/066528, filed Dec. 1, 2008 and designating the United States (published in French on Jun. 11, 2009 as WO 2009/071507 A1; the title and abstract were published in English), which claims priority under 35 U.S.C. §119 of Application No. 07/08445, filed in France on Dec. 4, 2007, each earlier application hereby expressly incorporated by reference in its entirety and each assigned to the assignee hereof.

The invention relates to a heat- and light-stabilized polyamide composition comprising a stabilization system that comprises copper oxide and KBr, having an excellent preservation of the mechanical properties after exposure to heat or to light. The invention also relates to a process for manufacturing these compositions and especially to the use of these compositions for producing articles in the automotive field.

Polyamide is a synthetic polymer widely used for the manufacture of various articles, such as molded and/or injection-molded parts. Polyamide may experience damage when it is subjected to external conditions or elements such as UV radiation, heat and/or bad weather. Damage can also be induced by the heat used during its manufacture and/or its forming. This instability is reflected by damage, losses in mechanical properties, and changes in color. These problems may become critical for a certain number of applications, such as in particular parts in the automotive field which are, in particular, subjected to high heat.

In order to improve the stability of the polyamides with respect to heat and/or light, it is known to combine them with particular stabilizers. Numerous additives are sold for this purpose. The use of copper iodide is known, for example, especially in combination with potassium iodide which is used in most cases and which provides good stabilization properties. It is also known to use more complex additives such as hindered phenolic antioxidant compounds, stabilizers having at least one hindered amine unit of HALS type or phosphorus-containing stabilizers.

However, there is a need to obtain polyamide compositions that perform even better as regards the stabilization with respect to heat and light, and that are obtained at lower cost.

The applicant has developed a novel polyamide composition that makes it possible to obtain excellent preservation of the mechanical properties after a long exposure to heat and to light. These compositions also have the advantage of maintaining their initial color, even after a long exposure to heat and to light.

The present invention relates to a composition comprising at least one polyamide matrix, a copper oxide and KBr.

The copper oxide may especially be $Cu_2O$ (cuprous oxide) or CuO (cupric oxide). The copper oxide may be in powder form. The composition especially comprises from 0.001% to 2% by weight of copper oxide, relative to the total weight of the polyamide, preferably from 0.005% to 0.5% by weight, particularly from 0.009% to 0.12% by weight.

The composition may also comprise other heat and/or light stabilizers such as KI, hindered phenolic compounds, stabilizers having at least one hindered amine unit of HALS type, or organic or inorganic phosphorus-containing stabilizers, such as sodium or manganese hypophosphite.

Use will preferably be made of a combination of copper oxide and KBr or KI.

In particular, a polyamide composition comprising $Cu_2O$ and KBr, in particular from 0.009% to 1.2% by weight of $Cu_2O$ and 0.1% to 1.2% by weight of KBr, relative to the weight of the polyamide in the composition, is preferred.

The polyamide of the invention is especially selected from the group consisting of the polyamides obtained by polycondensation of at least one aliphatic dicarboxylic acid with an aliphatic or cyclic diamine such as PA-6,6, PA-6,10, PA-6,12, PA-12,12, PA-4,6, MXD-6 or between at least one aromatic dicarboxylic acid and an aliphatic or aromatic diamine such as polyterephthalamides, polyisophthalamides, polyaramides, or their blend and (co)polyamides. The polyamide of the invention may also be selected from the polyamides obtained by polycondensation of at least one amino acid or lactam with itself, the amino acid possibly being generated by hydrolytic opening of a lactam ring such as, for example, PA-6, PA-7, PA-11, PA-12, or their blend and (co)polyamides. As a type of copolyamide, mention may especially be made of the polyamide PA-6/6,6.

Polyamides of PA-6 type and polyamides of PA-6,6 type are particularly preferred. A polyamide of PA-6 type is understood to mean a polyamide comprising at least 90% by weight of residues of caprolactam or aminocaproic monomers. A polyamide of PA-6,6 type is understood to mean a polyamide comprising at least 90% by weight of residues of adipic acid and hexamethylenediamine monomers.

The polyamides may have an apparent melt viscosity between 30 and 1200 Pa·s, measured according to the ISO 11443 standard at a shear rate of 1000 $s^{-1}$ and a temperature of 250° C., especially for polyamides of PA-6 type; or an apparent melt viscosity between 30 and 700 Pa·s, measured according to the ISO 11443 standard at a shear rate of 1000 $s^{-1}$ and a temperature of 280° C., especially for polyamides of PA-6,6 type.

In particular, it is possible to use polyamides of variable molecular weight by addition, before or during the polymerization of the polyamide monomers, or else in melt extrusion, of monomers that modify the length of the chains, such as, in particular, difunctional and/or monofunctional compounds having amine or carboxylic acid functional groups capable of reacting with the polyamide monomers or the polyamide.

The expression "carboxylic acid" is understood to mean carboxylic acids and derivatives thereof, such as acid anhydrides, acid chlorides and esters, for example. The term "amine" is understood to mean amines and derivatives thereof capable of forming an amide bond.

It is possible to use, at the start of, during or at the end of the polymerization all types of aliphatic or aromatic monocarboxylic or dicarboxylic acids, or all types of aliphatic or aromatic monoamine or diamine amines.

Use may very particularly be made of a polyamide of type PA-6,6, that is to say a polyamide obtained at least from adipic acid and hexamethylenediamine or salts thereof such as hexamethylenediamine adipate, which may optionally comprise other polyamide monomers. Use may especially be made, as polyamide, of a polyamide of type PA-6,6 obtained by addition, during polymerization, of an excess of hexamethylenediamine and of acetic acid or a polyamide of type PA-6,6 obtained by addition, during polymerization, of acetic acid.

Polyamides according to the invention may also be obtained by blending, especially melt blending. It is possible, for example, to blend one polyamide with another polyamide, or one polyamide with a polyamide oligomer, or else one polyamide with monomers that modify the length of the chains, such as, in particular, diamines, dicarboxylic acids, monoamines and/or monocarboxylic acids. It is possible, in particular, to add isophthalic acid or benzoic acid, for example at contents of around 0.2 to 1% by weight, to the polyamide.

The composition of the invention may also comprise copolyamides derived, in particular, from the above polyamides, or blends of these polyamides or (co)polyamides.

Use may likewise be made of branched polyamides of high fluidity, especially obtained by blending, during polymerization, in the presence of the polyamide monomers, at least one polyfunctional compound comprising at least three identical reactive functional groups of amine functional group or carboxylic acid functional group type.

It is also possible to use, as a polyamide of high fluidity, a star polyamide comprising star macromolecular chains and, where appropriate, linear macromolecular chains. The polymers comprising such star macromolecular chains are, for example, described in documents WO 97/24388 and WO 99/64496.

These star polyamides are especially obtained by blending, during polymerization, in the presence of polyamide monomers, an amino acid or lactam such as caprolactam, with at least one polyfunctional compound comprising at least three identical reactive functional groups of amine functional group or carboxylic acid functional group type. The expression "carboxylic acid" is understood to mean carboxylic acids and derivatives thereof, such as acid anhydrides, acid chlorides and esters, for example. The term "amine" is understood to mean amines and derivatives thereof capable of forming an amide bond.

Preferably, the polyfunctional compounds are selected from the group consisting of: 2,2,6,6-tetrakis(β-carboxyethyl)cyclohexanone, trimesic acid, 2,4,6-tri(aminocaproic acid)-1,3,5-triazine (TACT) and 4-aminoethyl-1,8-octanediamine, bishexamethylenetriamine, diaminopropane-N,N,N'N'-tetraacetic acid, 3,5,3',5'-biphenyltetracarboxylic acid, acids derived from phthalocyanine and from naphthalocyanine 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridine tetracarboxylic acid, trimesic acid, 1,2,4,5-benzene tetracarboxylic acid, diethylenetriamine, trialkylene tetramines and tetraalkylenepentamines, the alkylene preferably being ethylene, melamine, and polyalkylene amines, such as for example the Jeffamine T® compounds from Huntsman, especially Jeffamine T403® (polyoxypropylenetriamine).

The composition according to the invention may comprise between 20 and 80% by weight, preferably between 20 and 60% by weight, and more preferably between 35 and 55% by weight of polyamide, relative to the total weight of the composition.

The polymerization of the polyamide of the invention is especially carried out according to the conventional operating conditions for polymerization of polyamides, in continuous mode or batch mode.

Such a polymerization process may comprise, briefly:
heating the blend of polyamide monomers, and optionally of polyfunctional, difunctional and/or monofunctional compounds, with stirring and under pressure;
holding the blend under pressure and temperature for a given time, with removal of water vapor via a suitable device, then depressurization and holding for a given time at a temperature above the melting point of the blend, especially under autogenous pressure of water vapor, under nitrogen or under vacuum, in order thus to continue the polymerization by removal of the water formed.

At the end of polymerization, the polymer can be cooled, advantageously with water, and extruded in the form of rods. These rods are cut up in order to produce granules.

The composition according to the invention may comprise between 20 and 80% by weight, preferably between 20 and 60% by weight, and more preferably between 35 and 55% by weight of polyamide, relative to the total weight of the composition.

The copper oxide may be added in various ways in order to produce the composition according to the invention. It may especially be added at the start of, during or at the end of the polymerization of the polyamide, especially for polyamides of type PA-6,6. It may also be added as a blend with the polyamide.

The composition may also comprise fillers conventionally used for producing polyamide compositions. Mention may especially be made of reinforcing fibrous fillers, such as glass fibers or carbon fibers, or organic fibers, non-fibrous fillers, such as particulate fillers, lamellar fillers and/or exfoliable or non-exfoliable nanofillers such as alumina, carbon black, clays, zirconium phosphate, kaolin, calcium carbonate, copper, diatomaceous earths, graphite, mica, silica, titanium dioxide, zeolites, talc, wollastonite, polymeric fillers such as, for example, dimethacrylate particles, beads of glass or glass powder.

In particular, the use of reinforcing fibers, such as glass fibers, is preferred. Preferably, the most widely used fiber is glass fiber, of the chopped type, having a diameter between 7 and 14 μm, and a length of less than 5 mm. These fillers may have a surface size that ensures the mechanical adhesion between the fibers and the polyamide matrix.

The composition according to the invention may or may not comprise impact modifiers, especially those having an elastomeric base comprising functional groups that are reactive with the polyamide.

The composition may comprise, besides the modified polyamide of the invention, one or more other polymers, preferably polyamides or copolyamides.

The composition according to the invention may also comprise additives customarily used for the manufacture of polyamide compositions. Thus, mention may be made of lubricants, flame retardants, plasticizers, nucleating agents, catalysts, light and/or heat stabilizers, antioxidants, antistatic agents, dyes, matifying agents, molding aids or other conventional additives.

These fillers and additives may be added to the modified polyamide via standard means suitable for each filler or additive, such as for example during the polymerization or by melt blending.

The polyamide compositions are generally obtained by cold blending or melt blending of the various compounds that are incorporated into the composition, especially the polyamide, the copper oxide and the KBr. It is carried out at a higher or lower temperature and at a higher or lower shear stress depending on the nature of the various compounds. The compounds may be introduced simultaneously or successively. Generally, an extrusion device is used in which the material is heated, then melted and subjected to a shear stress, and transported. Such devices are fully known to a person skilled in the art.

According to a first embodiment, all the compounds are melt blended during a single operation, for example during an extrusion operation. It is possible, for example, to carry out a blending of granules of the polymer materials, introduce them into the extrusion device in order to melt them and subject them to a greater or lesser shear.

It is possible, according to particular embodiments, to produce molten or non-molten premixes of some of the compounds before preparation of the final composition.

The composition according to the invention, when it is prepared using an extrusion device, is preferably packaged in the form of granules. The granules are intended to be formed using processes that involve melting in order to obtain articles. The articles are thus constituted of the composition. According to one customary embodiment, the modified polyamide is extruded in the form of rods, for example in a twin-screw extrusion device, which rods are then cut up into granules. The molded parts are then produced by melting the granules produced above and feeding the composition in the melt state into forming devices, especially injection-molding devices.

The composition according to the invention may be used for any plastic-forming process, such as for example the process of molding, especially injection molding, extrusion, extrusion-blow molding or else rotomolding.

The present invention also relates to articles obtained by forming the composition according to the invention, for example by extrusion, molding or injection molding. Mention may be made, as articles, of those used in the automotive field, such as tanks, parts of air circuit systems such as air distributors, air ducts, turbo outlet ducts, and parts of cooling circuit systems such as air coolers, radiator tanks and housings.

Another subject of the present invention is a mixture comprising at least one copper oxide and KBr. This mixture may, for example, comprise only these two compounds, especially in powder form. This mixture may also comprise polyamide and at least copper oxide and KBr, especially in order to form a masterbatch.

Specific terms are used in the description so as to facilitate the understanding of the principle of the invention. It should nevertheless be understood that no limitation of the scope of the invention is envisaged by the use of these specific terms. The term "and/or" includes the meanings and, or, and also all the other possible combinations of the elements connected to this term.

Other details or advantages of the invention will appear more clearly in light of the examples below, given solely by way of indication.

EXPERIMENTAL SECTION

The compounds used are the following:
Polyamide 6,6: PA-6,6 of average viscosity 140 in formic acid from Rhodia;
$Cu_2O$: from Fluka;
KBr: from Fluka;
CuI: from Fluka;
KI: from Fluka;
glass fibers: 99B from Vetrotex;
elastomer: Exxelor VA 1803 from Exxon; and
other additives: lubricant, pigment, etc.

The compositions are manufactured by melt blending using a Werner&Pfleiderer ZSK 40 co-rotating twin-screw extruder under the following conditions: screw speed: 250 rpm, throughput: 40 kg/h, temperature profile: from 250 to 280° C., degassing: 0.9 bar. The polyamide, 50% by weight of glass fibers, 5% of elastomers, 0.2% of additives and a certain proportion of stabilizers as mentioned in the table below are mixed. The stabilizers are added at the beginning of the extruder.

The granules obtained are then molded with a Demag Ergotech Viva 50-270 press under the following conditions: temperature profile: 280-300° C., mold temperature: 90-100° C., screw speed: 120 rpm, injection speed: 80 $cm^3/s$, backpressure: 10 bar.

The results of the properties of maintaining the mechanical properties before and after an aging test are mentioned in the following table:

TABLE 1

| COMPOSITIONS | IMPACT STRENGTH BEFORE AGING | IMPACT STRENGTH AFTER AGING |
|---|---|---|
| C1/without stabilizer | 65 | 10 |
| C2/0.08% CuI + 0.45% KI | 65 | 22 |
| 3/0.06% $Cu_2O$ | 67 | 18 |
| 4/0.06% $Cu_2O$ + 0.45% KBr | 69 | 27 |

The percentages are expressed by weight relative to the weight of the polyamide of the composition.

The impact strength (Charpy unnotched impact strength) is measured according to the ISO 179-1/1 Fu standard. The aging is carried out in ambient air at 200° C. for 31 days and then 7 days at 220° C.

What is claimed is:

1. An admixture comprising at least one polyamide having an apparent viscosity in the molten state ranging from 30 to 1200 Pa.s, measured according to ISO 11443 and a heat- and light-stabilizing amount of $Cu_2O$ and KBr, wherein said at least one polyamide comprises at least one PA-6 polyamide or PA-6,6 polyamide, wherein the concentration of $Cu_2O$ is from 0.001% to 2% by weight relative to the total weight of said at least one polyamide, wherein the concentration of KBr is from 0.1% to 1.2% by weight relative to the total weight of said at least one polyamide, and wherein the admixture comprises a branched polyamide or a star polyamide.

2. The admixture as defined in claim 1, wherein said admixture comprises a blend of polyamides.

3. The admixture as defined in claim 1, wherein said admixture comprises at least one (co)polyamide and/or star polyamide.

4. The admixture as defined in claim 1, wherein said admixture comprises between 20 and 80% by weight of said at least one polyamide, relative to the total weight of the composition.

5. The admixture as defined in claim 1, wherein said admixture comprises from 0.009% to 1.2% by weight of $Cu_2O$.

6. The admixture as defined in claim 1, further comprising at least one other heat and/or light stabilizer selected from the group consisting of KI, hindered phenols, stabilizers having at least one hindered amine structural unit, organic phosphorus-containing stabilizers, inorganic phosphorus-containing stabilizers, sodium hypophosphite and manganese hypophosphite.

7. The admixture as defined in claim 1, further comprising fibrous and/or non-fibrous reinforcing fillers.

8. The admixture as defined in claim 7, wherein said fibrous fillers comprise glass fibers.

9. The admixture as defined in claim 1, further comprising impact modifiers.

10. An admixture comprising at least one polyamide and a heat- and light-stabilizing amount of at least one copper oxide and KBr, wherein the at least one polyamide comprises linkages of isophthalic acid or benzoic acid and said isophthalic acid or benzoic acid is present in an amount from 0.2% wt % to 1 wt % of the composition.

11. The admixture as defined in claim 1, wherein said at least one polyamide is:
(a) a PA-6 polyamide having an apparent viscosity in a molten state ranging from 30 to 1200 Pa·s or 30 to 700 Pa·s, measured according to ISO 11443, or
(b) a PA-6,6 polyamide having an apparent melt viscosity ranging from 30 to 700 Pa·s, measured according to the ISO 11443 standard at a shear rate of 1000 s$^{-1}$ and a temperature of 280° C.

12. The admixture as defined in claim 1, said branched polyamide or star polyamide having an apparent viscosity in a molten state ranging from 30 to 700 Pa·s, measured according to ISO 11443.

13. An admixture comprising at least one polyamide and a heat- and light-stabilizing amount of at least one copper oxide and KBr, wherein the at least one polyamide comprises linkages of isophthalic acid or benzoic acid, said at least one polyamide having an apparent viscosity in a molten state ranging from 30 to 1200 Pa·s or 30 to 700 Pa·s, measured according to ISO 11443, and said isophthalic acid or benzoic acid is present in an amount from 0.2% wt % to 1 wt % of the composition.

14. The admixture as defined in claim 13, wherein said at least one oxide of copper comprises $Cu_2O$.

15. The admixture of claim 1, wherein said admixture, upon being extruded to form granules and the granules are molded into a article, provides said article, after aging for 31 days in ambient air at 200° C. followed by 7 days of aging at 220° C., with a Charpy unnotched impact strength as measured according to ISO 179-1/1 Fu standard that is greater than that of a similar article made from the admixture comprising comparable amounts of (a) $Cu_2O$ without KBr or (b) CuI and KI.

16. The admixture of claim 10, wherein the copper oxide comprises $Cu_2O$, wherein the concentration of $Cu_2O$ is from 0.009% to 1.2% by weight relative to the total weight of said at least one polyamide and wherein the concentration of KBr is from 0.1% to 1.2% by weight relative to the total weight of said at least one polyamide.

17. The admixture of claim 14, wherein the concentration of $Cu_2O$ is from 0.009% to 1.2% by weight relative to the total weight of said at least one polyamide and wherein the concentration of KBr is from 0.1% to 1.2% by weight relative to the total weight of said at least one polyamide.

* * * * *